United States Patent [19]

Olbres

[11] 4,061,227

[45] Dec. 6, 1977

[54] SHOCK AND HEAT RESISTANT STORAGE UNIT

[75] Inventor: Anthony Olbres, Hampton, N.H.

[73] Assignee: The Morley Company, Portsmouth, N.H.

[21] Appl. No.: 722,477

[22] Filed: Sept. 13, 1976

Related U.S. Application Data

[63] Continuation of Ser. No. 571,420, April 24, 1975, abandoned.

[51] Int. Cl.² .................. B65D 81/16; B65D 85/30
[52] U.S. Cl. .................... 206/454; 206/816; 220/350; 312/297
[58] Field of Search .............. 206/527, 73, 74, 454, 206/551, 816, 523, 521; 220/339, 22.3, 22, 350, 9 F; 312/297

[56] References Cited

U.S. PATENT DOCUMENTS

| 813,679 | 2/1906 | Vetter | 312/297 |
| 2,107,997 | 2/1938 | Horsley | 312/297 |
| 2,985,333 | 5/1961 | Kirkman | 220/22 |
| 3,441,071 | 4/1969 | Schurman et al. | 220/339 |

Primary Examiner—William T. Dixson, Jr.
Attorney, Agent, or Firm—Dike, Bronstein, Roberts, Cushman & Pfund

[57] ABSTRACT

A storage unit comprising an outer structure within which is supported an inner structure the bottom and ends of which are spaced from the bottom and ends of the outer structure, said structures being comprised of a rigid synthetic foam material such as provides heat and shock resistance to articles stored within the unit and an articulated closure situated in the space between the structures which is arranged to be withdrawn therefrom along tracks provided in the side walls of the outer structure to cover the interior of the unit.

1 Claim, 9 Drawing Figures

4,061,227

SHOCK AND HEAT RESISTANT STORAGE UNIT

This is a continuation of application Ser. No. 571,420 filed Apr. 27, 1975, now abandoned.

BACKGROUND OF INVENTION

IBM Diskettes and the like are customarily enclosed in a jacket forming a cartridge which is stored in a removable protective envelope. Ten such envelopes are stored in a box, the boxes serving as desk top mini files. The enveloped are tabbed for color coding and color coded black identification labels are provided for the operator's use. The purpose of this invention is to provide a storage unit for receiving the contents of such boxes all in one unit, color coded for use which will be light in weight, durable and constitute an insulation to heat and shock for the diskettes stored therein. No such storage units are known to be available for this purpose at this time.

SUMMARY OF INVENTION

As herein illustrated, the storage unit comprises an outer structure embodying a bottom and end and side walls, said side walls rising above the end walls and an inner structure embodying a bottom and end walls supported within the outer structure with the bottom and end walls spaced inwardly from the wall to the outer structure so as to define a space between the outer and inner structures, said end walls terminating at the level of the end walls of the outer structure, an articulated closure member situated in the space between the outer and inner structures adapted to be withdrawn from one end of the space and tracks at the inner sides of the portions of the side walls of the outer structure above the end walls for slidingly receiving the opposite edges of the closure such that the latter may be drawn along said tracks to cover the interior of the unit. The inner sides of the side walls of the outer structure contain spaced grooves running parallel to each other for receiving the opposite edges of the bottom and end of the outer structure and the bottom and end of the inner structure to thus support the inner structure nested within the outer structure. At the front end wall of the outer structure and the end wall of the inner structure have transversely extending mutually engaged inwardly and outwardly extending rabbeted shoulders which assist in supporting the inner structure in spaced relation to the outer structure and rigidifying the unit. There are grooves of shallower depth between the spaced grooves within which the edges of the bottom and ends of the structures are received which parallel the space between the structures and extend upwardly from the ends across the top within which the edges of an articulated closure member are slidingly situated so that the closure can be moved to a covering position in the grooved portions of the side walls above the inner structure or to an open position to within the space between the structures below the inner structure. The mating shoulders at the front end provide a stop for the closure when the latter is fully extended to cover the interior of the structure. The interior of the inner structure is divided longitudinally into a plurality of transverse compartments for receiving boxes of diskettes, and to provide for insulation against heat and shock, the inner and outer structures are comprised of rigid synthetic foam embodying heat and shock resistance characteristics. The side walls are single units and the bottom and end walls of each of the structures are integral molded units. The articulated closure is of conventional design commonly known as a tambour and is comprised of narrow slats of synthetic material joined by hinges of reduced thickness.

The invention will now be described in greater detail with reference to the accompanying drawings, wherein.

Figure 5:
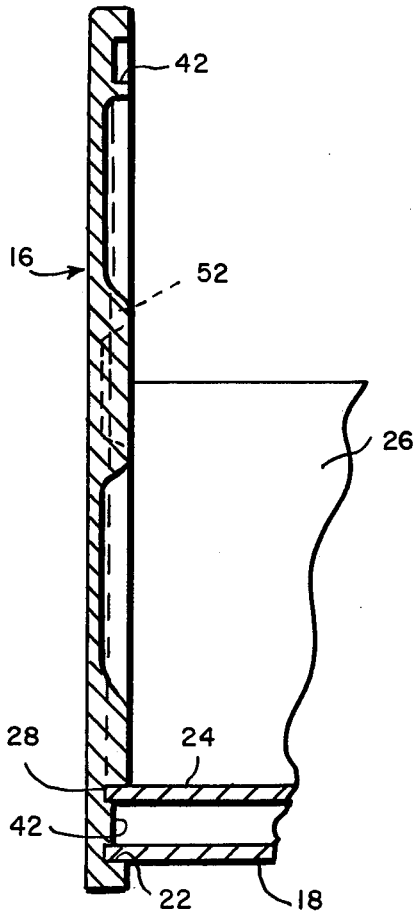
FIG. 5 is a fragmentary vertical transverse section showing one side wall and portions of the inner and outer bottom and end walls.
Figure 6:
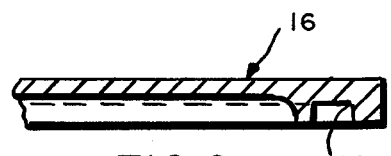
FIG. 6 is a fragmentary section taken on the line 6—6 of FIG. 2.
Figure 7:
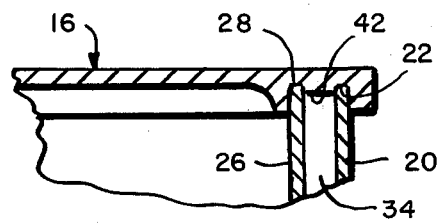
FIG. 7 is a fragmentary section taken on the line 7—7 of FIG. 2.
Figure 8:
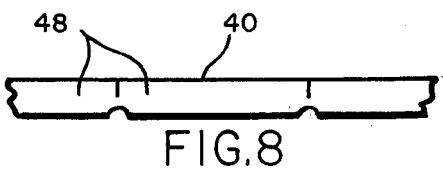
FIG. 8 is a fragmentary elevation of the closure member.
Figure 9:
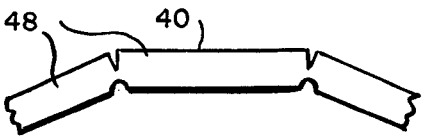
FIG. 9 is an elevation corresponding to FIG. 8 showing the articulated structure.

The outer structure 10 is comprised of two side wall members 16-16 and a bottom and end walls 18 and 20-20. The bottom wall 18 is substantially coextensive with the side walls and the end walls 20-20 extend upwardly from the bottom wall approximately half the height of the side walls. The side walls, bottom and end walls of the outer structure are interconnected by means of grooves 22-22 at the inner sides of the side walls within which the edges of the bottom and end walls are interengaged as shown in FIG. 5. The interengaging portions of the bottom and end walls with the grooves are suitably fastened, for example, by cementing or welding to form a rigid structure.

Figure 1:
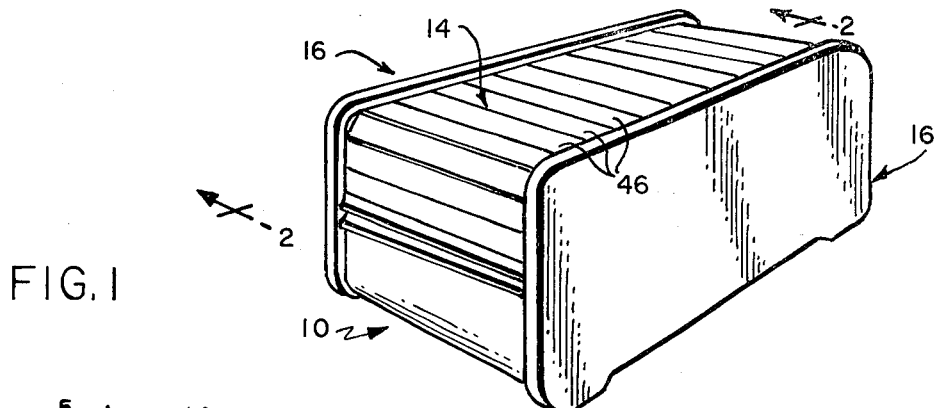
FIG. 1 is an isometric of the storage unit with the closure extended to cover the interior of the structure.
Figure 2:
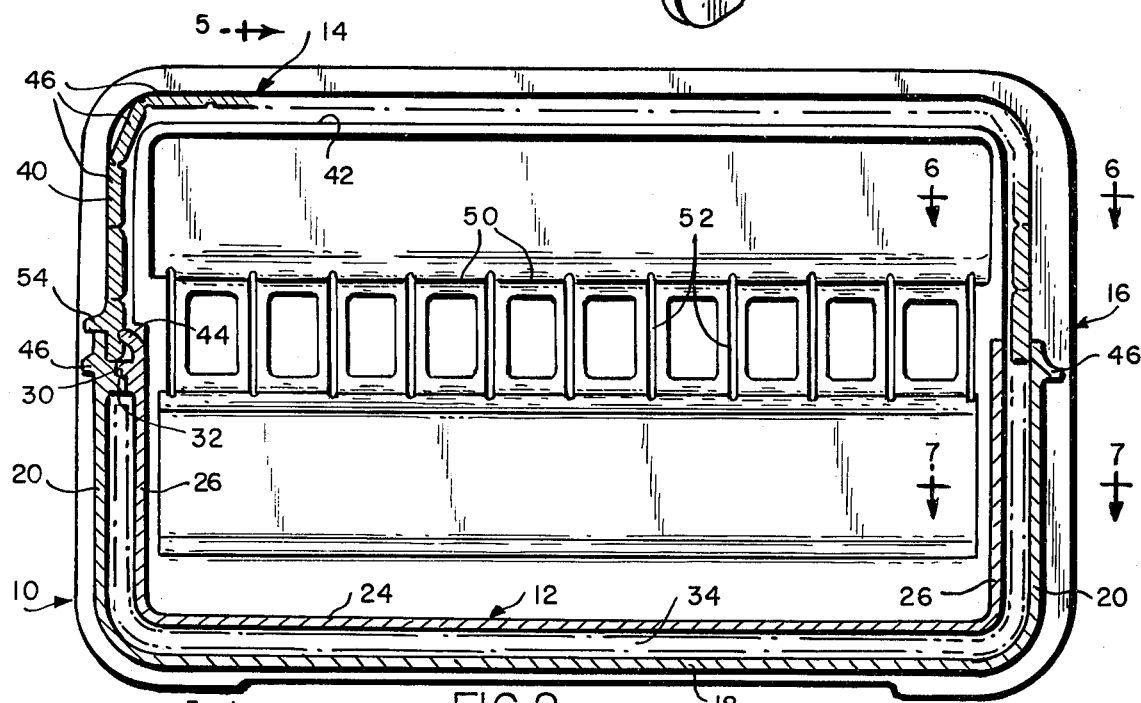
FIG. 2 is a vertical section taken longitudinally of the structure on the line 2—2 of FIG. 1.
Figure 3:
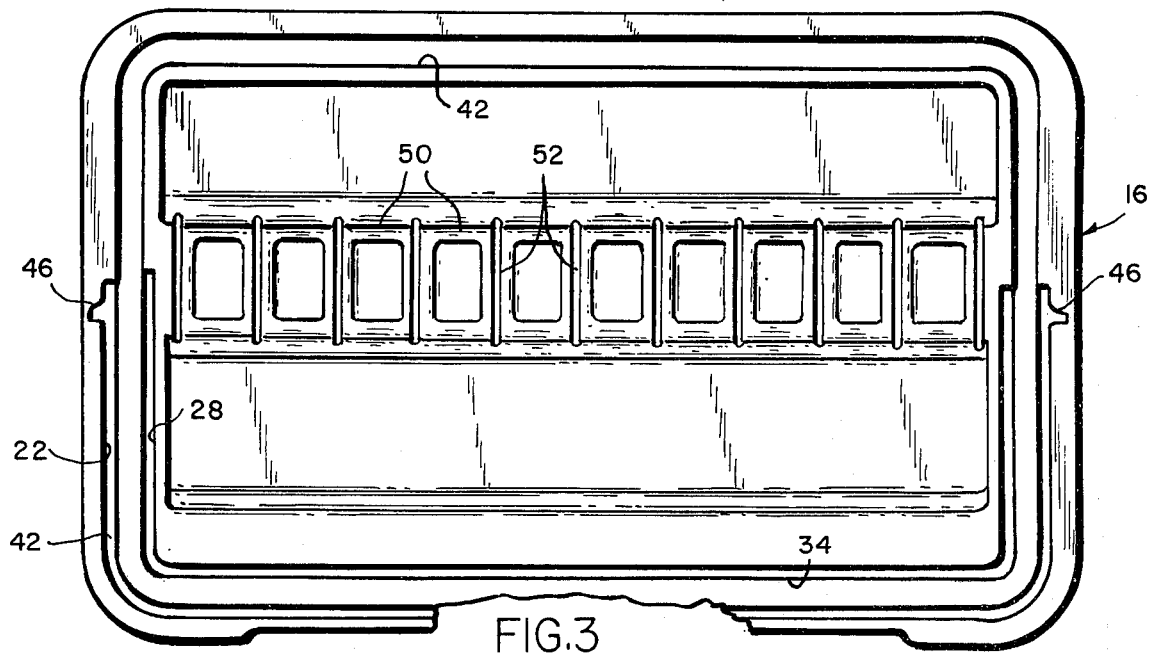
FIG. 3 is an elevation of one of the side walls of the structure as seen from the inner side thereof.
Figure 4:
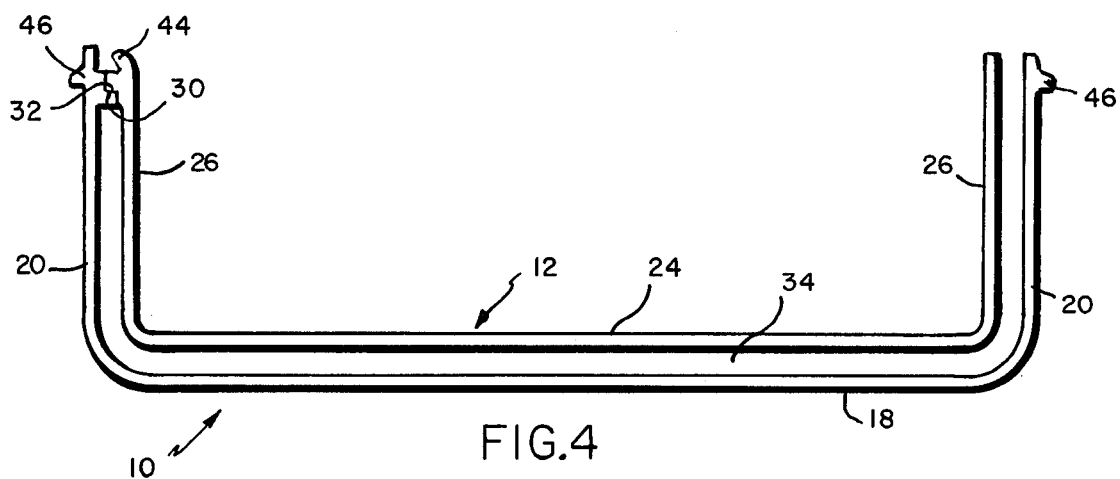
FIG. 4 is an elevation of the nested inner and outer bottom and end wall structures.

The inner structure 12, as shown in FIG. 4, comprises a bottom wall 24 and end walls 26-26, and is supported within the outer structure with its bottom and end walls spaced from those of the outer structure by interengagement of their edges with grooves 28-28 formed at the inner sides of the side walls inwardly of the grooves 22-22 and parallel thereto. At the inner sides of the front end of the unit shown in FIG. 2 there are at the inner side of the front end of the outer structure and the outer side of the front end of the inner structure, respectively, inwardly and outwardly projecting transversely extending rabbeted shoulders 30 and 32 which strengthen the support for the inner structure and add to the rigidity of the unit.

The space 34 between the bottom and ends of the respective structures is designed to slidingly receive the articulated closure member 14 which is disposed therein and in addition inhibits heat transfer and shock transfer to the articles, that is, the diskettes stored within the unit.

At the opposite sides of the space 34 within which the closure 14 is situated there are in the inner sides of the side walls grooves 42-42 between the grooves 26,28 for receiving the opposite edges of the closure and these grooves 42-42 extend upwardly from the upper edges of the end walls into the portions of the side walls which extend above the end walls and along the upper edges of the end walls so that the closure may be withdrawn from the space 34 upwardly at the back of the unit, across the top and downwardly over the front of it into engagement with the upper side of the inner engaged shoulder members 30 and 32 to a closed position covering the interior of the unit.

A lip 44 is provided along the shoulder member 32 for resiliently engaging the leading edge of the closure member to hold it in a closed position and handles 46-46 are provided at the outer side of the end walls to facilitate transporting the unit. A lip 54 at the leading edge of the closure member provides for manipulation of the closure and prevents it from slipping downwardly into the space 34 beyond the upper ends of the rear walls 20, 26 so as to be inaccessible.

The entire structure is preferably comprised of a molded foam plastic, the side members being molded in one piece with the groove formed therein for receiving the bottoms and ends of the outer and inner structures and the bottom and ends of the outer and inner structures being molded as an integral single unit. The molded foam of which the structures are comprised is sufficiently rigid and durable to withstand the long usage and at the same time afford resistance to heat transfer and shock. It is to be understood, of course, that the structure could be comprised of other than the foam plastic proposed in the event that the articles to be stored therein do not require protection from heat and-/or shock, for example, of sheet metal or a non-porous molded plastic.

The closure is of conventional structure being comprised of a plurality of narrow parallel slats 48 hingedly joined along their long edges to each other and in a form such as has been employed for roll top desks or the like, commonly known as a "tambour" and as herein illustrated molded of plastic with the hinges formed by reduced sections of plastic.

The interior structure is divided up longitudinally into a plurality of compartments by spacers 50 inserted into grooves 52-52 formed on the inner sides of the side walls intermediate the upper and lower edges. The dividers divide up the interior structure into spaces which are designed to receive boxes of 10 diskettes as referred to above.

It should be understood that the present disclosure is for the purpose of illustration only and includes all modifications or improvements which fall within the scope of the appended claims.

I claim:

1. A shock and heat-resistant storage unit comprising spaced parallel side wall panels of foam plastic, each of which contains at its inner side a first continuous groove of predetermined depth which runs parallel to the top, bottom and ends of the side walls and outer and inner second and third continuous grooves of predetermined greater depth than the first groove which runs parallel to the bottom and up the ends of the side wall panels at opposite sides of the first groove to a level substantially midway between the top and the bottom, the outer grooves containing at their upper ends laterals, an outer U-shaped bottom wall molding comprising a bottom panel and integral end panels, the opposite edges of said bottom panel and end panels being engaged within said outer grooves and said end panels having at their upper ends outwardly projecting, transversely extending shoulders interengaged with the laterals at the upper ends of the outer grooves, one of the end panels having at its inner side below the top an inwardly projecting, transversely extending shoulder, said side wall panels and U-shaped bottom wall molding collectively constituting an outer supporting structure which is resistant to heat transfer and shock; an inner U-shaped bottom molding comprising a bottom panel and integral end panels, the opposite edges of said bottom panel and integral end panels being engaged within the inner grooves and one of the panels of the inner U-shaped bottom wall molding having at its upper end an outwardly divergent, transversely extending lip and below the lip an outwardly projecting, transversely extending shoulder which rests on the transversely extending shoulder along the upper end of said one of the panels of the outer U-shaped bottom wall molding, said lip providing in conjunction with the end panel at the upper end of said outer U-shaped bottom molding, a transversely extending open locking groove narrower at the top than at the bottom and an articulated closure member comprising a plurality of spaced, parallel, transversely extending narrow slats integrally joined along their longitudinal edges by hinge means and of a length corresponding to a distance between the bottoms of the first groove disposed in the space between the outer and inner U-shaped bottom wall moldings with their opposite ends slidingly engaged with said first grooves for movement in said first grooves from a position concealed within the space between the outer and inner U-shaped bottom moldings to a position covering the open top of the structure, said closure having along one end a latch adapted to be forced into the locking groove to lock the closure in its closed position and a part extending outwardly therefrom which provides a fingerhold by means of which the latch may be engaged with and disengaged from said locking groove and said wall panels having at their inner sides longitudinally spaced, parallel, vertically disposed slots for removably receiving panels to divide the interior into a plurality of compartments and panels mounted in said slots.

* * * * *